(12) United States Patent
Dominguez Romero et al.

(10) Patent No.: US 8,254,861 B2
(45) Date of Patent: Aug. 28, 2012

(54) CONTROLLING X-WAY RECEIVER DIVERSITY

(75) Inventors: Francisco Javier Dominguez Romero, Madrid (ES); Andrea De Pasquale, Madrid (ES)

(73) Assignee: Vodafone Group PLC, Newbury, Berkshire (GB)

( * ) Notice: Subject to any disclaimer, the term of this patent is extended or adjusted under 35 U.S.C. 154(b) by 331 days.

(21) Appl. No.: 12/689,987

(22) Filed: Jan. 19, 2010

(65) Prior Publication Data

US 2010/0210232 A1 Aug. 19, 2010

(30) Foreign Application Priority Data

Jan. 16, 2009 (ES) .................................... 200900121

(51) Int. Cl.
*H04B 7/08* (2006.01)
*H04B 17/00* (2006.01)
(52) U.S. Cl. ................... 455/140; 455/226.1; 455/277.1
(58) Field of Classification Search .................. 455/230, 455/226.1, 277.1, 280, 132, 140, 272, 273, 455/130, 133
See application file for complete search history.

(56) References Cited

U.S. PATENT DOCUMENTS

| | | | | |
|---|---|---|---|---|
| 6,067,449 | A * | 5/2000 | Jager | 455/277.2 |
| 6,115,591 | A * | 9/2000 | Hwang | 455/277.2 |
| 6,678,508 | B1 | 1/2004 | Koilpillai et al. | |
| 6,970,523 | B2 * | 11/2005 | Strolle et al. | 375/345 |
| 7,024,168 | B1 | 4/2006 | Gustaffsson et al. | |
| 7,116,959 | B1 * | 10/2006 | Link et al. | 455/277.1 |
| 7,310,503 | B2 * | 12/2007 | Ido | 455/140 |
| 7,444,166 | B2 * | 10/2008 | Sahota | 455/553.1 |
| 7,672,410 | B2 * | 3/2010 | Yang et al. | 375/347 |
| 7,929,985 | B2 * | 4/2011 | Khayrallah et al. | 455/550.1 |
| 7,949,366 | B2 * | 5/2011 | Rofougaran | 455/552.1 |
| 2002/0021673 | A1 | 2/2002 | Agin et al. | |
| 2003/0190924 | A1 | 10/2003 | Agashe et al. | |
| 2005/0197079 | A1 | 9/2005 | Banister et al. | |
| 2007/0111689 | A1 | 5/2007 | Link et al. | |
| 2008/0132265 | A1 | 6/2008 | Tudosoiu | |

FOREIGN PATENT DOCUMENTS

| | | |
|---|---|---|
| WO | WO9411958 A1 | 5/1994 |
| WO | WO0105088 A1 | 1/2001 |
| WO | WO 2007/110925 | 10/2007 |

OTHER PUBLICATIONS

Spanish Search Report issued on Jan. 16, 2009 in connection with Spanish Patent Application 200900121.

* cited by examiner

*Primary Examiner* — Sonny Trinh
(74) *Attorney, Agent, or Firm* — Workman Nydegger

(57) ABSTRACT

A method for controlling receiver diversity operation in a base station of a mobile telecommunications network. The base station includes a first receiver arrangement and a second receiver arrangement. The method includes activating the first receiver arrangement, thereby receiving signals at a first gain level. The method also includes activating the second receiver arrangement, thereby receiving signals at a second gain level, the second gain level being equal to or lower than the first gain level. The method further includes measuring baseband consumption at the base station at predetermined intervals. The method finally includes, when the baseband consumption exceeds a predetermined deactivation threshold THDE, deactivating the first receiver arrangement, thereby leaving only the second receiver arrangement active.

6 Claims, 2 Drawing Sheets

CONTROLLING X-WAY RECEIVER DIVERSITY

CROSS-REFERENCES AND RELATED APPLICATIONS

This application claims the benefit of Spanish Patent Application No. ES 200900121, filed Jan. 16, 2009, entitled "CONTROLLING X-WAY RECEIVER DIVERSITY," which is incorporated herein by reference in its entirety.

RELEVANT FIELD

Embodiments of the present invention relate to the field of mobile telecommunications, and more specifically in providing methods for controlling the activation and deactivation of x-way receiver (such as a 4-way receiver) diversity of a base station in a mobile network based on baseband consumption (i.e. traffic load), and this way minimizing the baseband hardware requirements.

BACKGROUND

Typically the base stations in the current mobile networks use receiver diversity, i.e. the signal is received through 2 antennas or 1 antenna with 2 cross-polar receivers, combining the signals and obtaining a gain in coverage. This is applicable to the GSM, UMTS, LTE, WiMAX or any other cellular network.

More recently it has become feasible to offer 4 way receiver diversity, which gives more gain than the 2-way receiver at the expense of a higher processing overhead. As an example, in UMTS the gain can be of about 2.5 dB, improving the coverage and the throughput obtained in HSDPA due to the gain in the uplink.

In general terms, the disadvantage of multiple (x-way) receiver diversity technology is that the baseband consumption is very high as the signal has to be processed x/2 more times than with the 2 way. This means more baseband hardware needed in the base stations.

It is well-known that abbreviations and acronyms are frequently used in the mobile telephony field. Below is a glossary of acronyms/terms used throughout the present specification:
GSM Global System for Mobile Communications
LTE Long Term Evolution
CS Circuit Switched
PS Packet Switched
RNC Radio Network Controller
UMTS Universal Mobile Telecommunications System
HSDPA High Speed Downlink Packet Access
WiMAX Worldwide Interoperability for Microwave Access
Summary of Example Embodiments Embodiments of the invention relate to methods and systems for controlling receiver diversity operation in a base station of a mobile telecommunications network.

In one example embodiment, a base station comprises a first receiver arrangement and a second receiver arrangement and is operated in accordance with steps, including:
  activating the first receiver arrangement, thereby receiving signals at a first gain level;
  activating the second receiver arrangement, thereby receiving signals at a second gain level, said second gain level being equal or lower than said first gain level;
  measuring baseband consumption at the base station at predetermined intervals; and
  if the baseband consumption exceeds a predetermined deactivation threshold $TH_{DE}$ deactivating the first receiver arrangement, thereby leaving only the second receiver arrangement active.

In a disclosed embodiment, the above method further comprises the following step:
  if the baseband consumption goes below a predetermined activation threshold $TH_{AC}$, activating the first receiver, thereby receiving signals at an increased gain level in the base station.

The first receiver arrangement can be a 4-way receiver arrangement and the second receiver arrangement can be a 2-way receiver arrangement.

The example method is thus an algorithm integrated in base stations. The algorithm allows a network to switch automatically between "normal" two-way receiver diversity operation and x-way receiver diversity operation based on the baseband occupation. For example, in case of congestion of the baseband resources it can switch from 4-way receiver to 2-way receiver.

One advantage lies in the way x-way diversity activation is automatic and dynamically related to the baseband occupation. It is thus possible to activate x-way receiver diversity without the need to add more baseband. As a result fewer baseband boards are required in every base station even when 4-way (or in general, x-way) receiver diversity operation is activated.

In an exemplary system the base station comprises a first receiver arrangement and a second receiver arrangement, wherein the first receiver arrangement is initially activated and thereby receiving signals at a first gain level, and the second receiver arrangement is activated and thereby receiving signals at a second gain level. The second gain level is equal or lower than said first gain level. In this example environment, the example system comprises a baseband unit configured for:
  measuring baseband consumption at the base station at predetermined intervals, and
  in case the baseband consumption exceeds a predetermined deactivation threshold $TH_{DE}$ deactivating the first receiver arrangement, thereby leaving only the second receiver arrangement active.

In a preferred embodiment the baseband unit is additionally configured for, in case the baseband consumption goes below a predetermined activation threshold $TH_{AC}$, activating the first receiver, thereby receiving signals at an increased gain level in the base station, The first receiver arrangement is preferably a 2-way receiver arrangement and the second receiver arrangement is preferably a 2-way receiver arrangement.

BRIEF DESCRIPTION OF THE DRAWINGS

A series of drawings which aid in better understanding the invention and which are expressly related with an embodiment of said invention, presented as a non-limiting example thereof, are very briefly described below.

DETAILED DESCRIPTION OF EXAMPLE EMBODIMENTS

Figure 1:
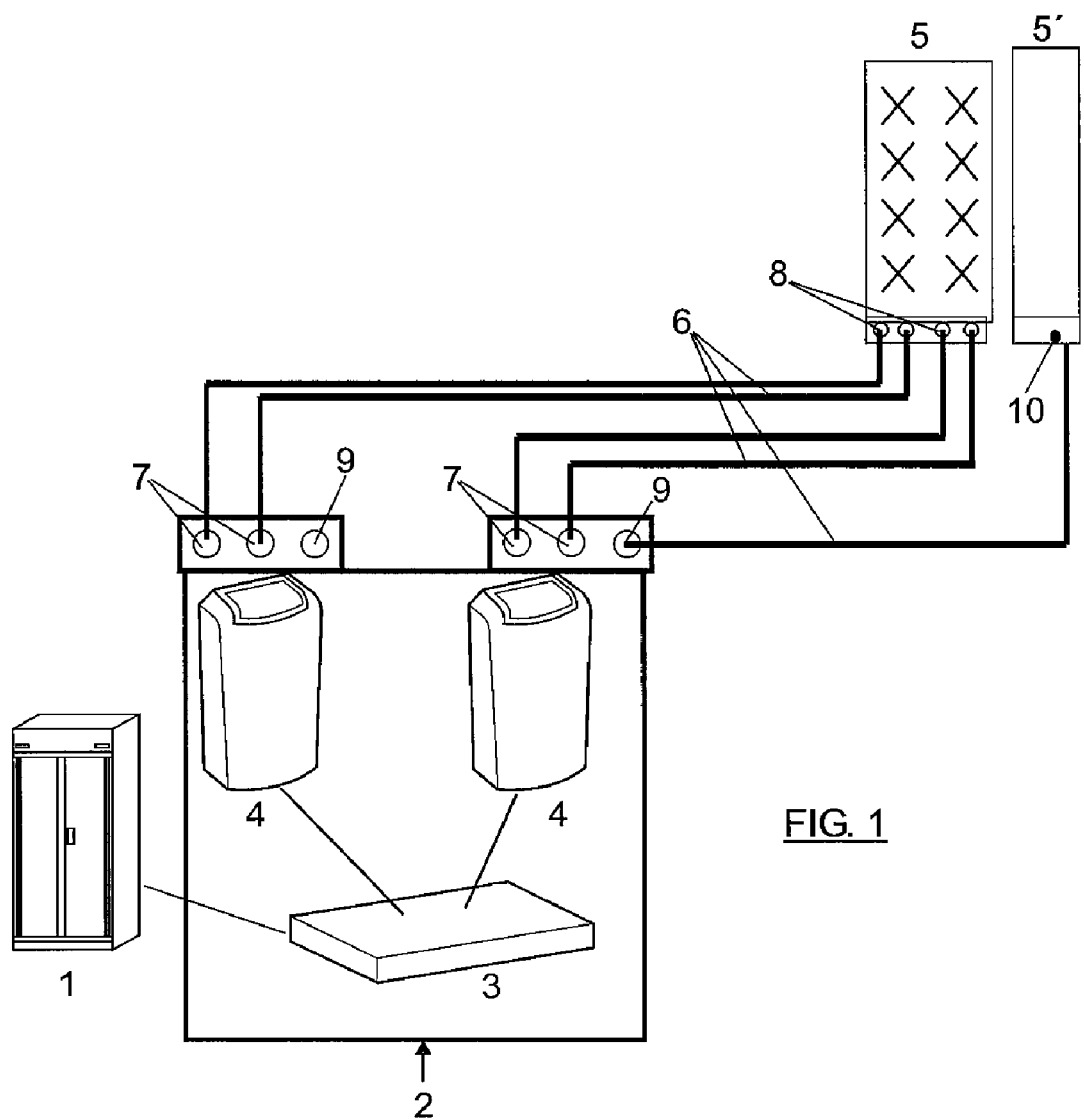
FIG. 1 shows a typical installation of a 4-port combined antenna of a 3G network.

FIG. 1 shows a typical installation of a 4-port antenna as a receiver (RX) antenna plus another antenna for the transmitter (TX) part.

Depending on site configuration, RX antenna 5 and TX 5' antennas can be separate as in this FIG. 1, or combined (as it is normally used).

In the FIG. 1, the RNC 1 is connected to the Base Station or Node B 2. The Node B 2 has different parts: the BBU 3 (Baseband Unit) which is the baseband part where all the processing is performed, then the BBU 3 is connected to two RRU (Remote Radio Unit), a first RRU 4 and a second RRU 4' which is the part that amplifies the radiofrequency signal to be sent through the antenna. The connection between BBU 3 and RRU (4,4') is done with optical fibre. Then the second RRU 4' is connected to the TX antenna 5' with a RF coaxial cable 6. An RF cable 6 is needed to connect the RX ports 7 of the RX antenna 5 to the RX ports 8 of the Node B 2. RF cables 6 are also used in order to connect the TX ports 9 of the Node B 2 to the TX port 10 of the TX antenna 5'.

When switching from 4-way receiver diversity operation to 2-way receiver diversity operation, the baseband unit 3 processes the RX coming from 2 RX ports only, ignoring the signal received by the other 2 RX ports received from the second RRU.

Figure 2:
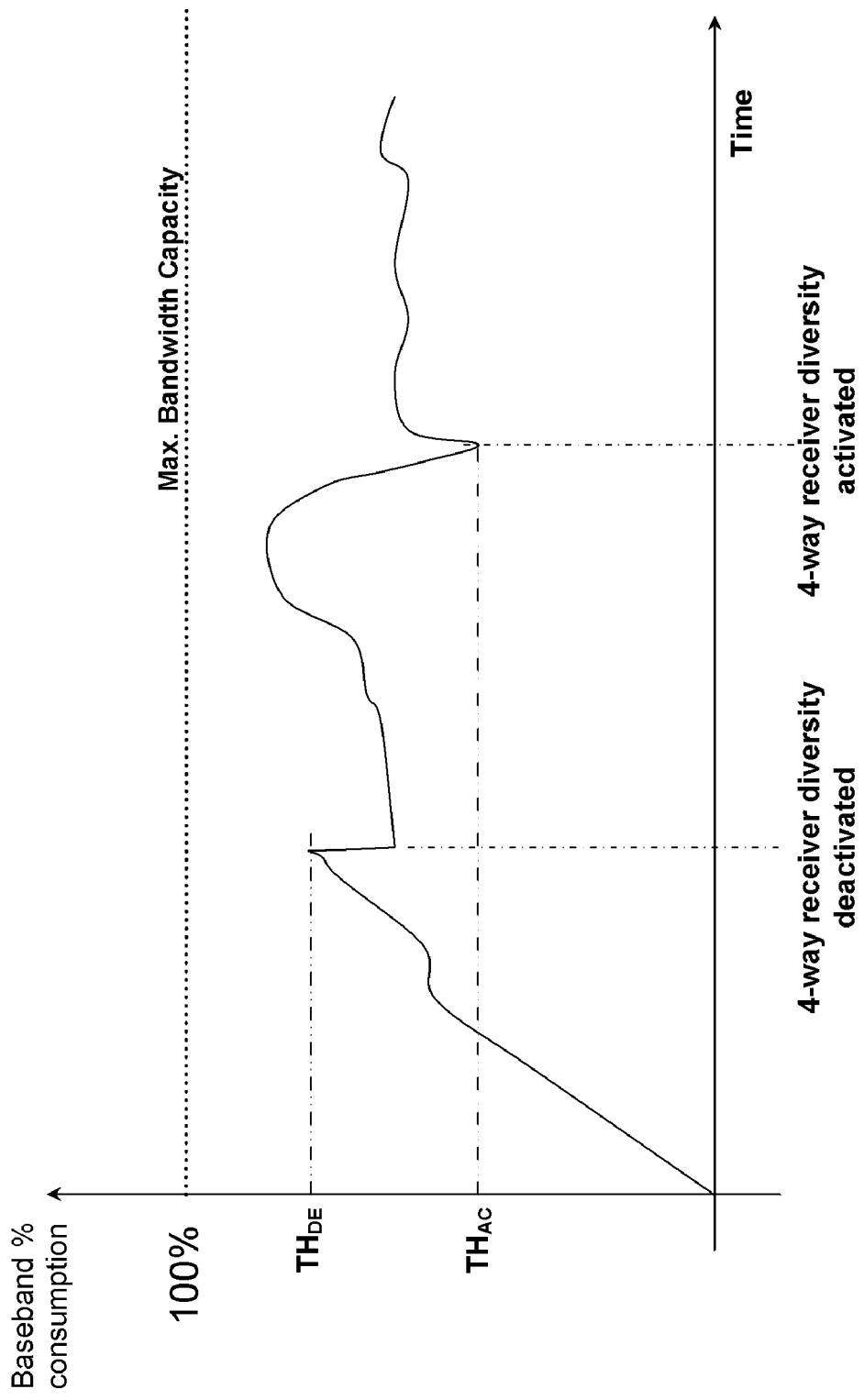
FIG. 2 shows an example of an activation-deactivation of 4-way receiver diversity process according with the baseband consumption level, as proposed by the invention.

The exemplary method is based on dynamic measurement of the traffic load of the baseband processing equipment. As shown in FIG. 2, when the load of the processors (the baseband consumption), exceeds a predetermined deactivation threshold $TH_{DE}$ (configurable by the operator), the 4-way receiver diversity is deactivated, losing some peak rate throughput in uplink PS data as well as a reduction of around 2.5 dB in the uplink coverage for voice/CS services, but maximising the overall cell capacity as far as the baseband is concerned.

The newly available baseband can be now used in either downlink or uplink in order to admit new communications or to increase the throughput in either downlink or uplink.

Once deactivated, the baseband load is checked periodically until it is lower than a predetermined activation threshold $TH_{AC}$, that can be the same previous threshold plus a predetermined offset to avoid hysteresis, and when this happens, the 4-way receiver is activated again.

The step from 4-way to 2-way is controlled by the BBU 3. Once the activation threshold is reached, the BBU 3 deactivates the RRU processing the 2 way receiver diversity operation and do not decode these 2 signals.

This can be generalised to a x-way receiver in which an algorithm would switch from x-way to a x/2 receiver to reduce the capacity consumption.

The algorithm is valid for any technology: GSM, UMTS, LTE, WiMAX, etc.

The invention claimed is:

1. A method for controlling receiver diversity operation in a base station of a mobile telecommunications network, the base station comprising a first receiver arrangement and a second receiver arrangement, the method comprising:
    activating the first receiver arrangement, thereby receiving signals at a first gain level;
    activating the second receiver arrangement, thereby receiving signals at a second gain level, said second gain level being equal to or lower than said first gain level;
    measuring baseband consumption at the base station at predetermined intervals; and
    if the baseband consumption exceeds a predetermined deactivation threshold THDE deactivating the first receiver arrangement, thereby leaving only the second receiver arrangement active.

2. The method as claimed in claim 1, further comprising:
    if the baseband consumption goes below a predetermined activation threshold THAC, activating the first receiver arrangement, thereby receiving signals at an increased gain level in the base station.

3. The method according to claim 1, wherein the first receiver arrangement is a 2-way receiver arrangement and the second receiver arrangement is a 2-way receiver arrangement, such that the first and second receiver arrangement together form a 4-way receiver arrangement.

4. A system for controlling receiver diversity operation in a base station of a mobile telecommunications network, the base station comprising:
    a first receiver arrangement and a second receiver arrangement, said first receiver arrangement being initially activated and thereby receiving signals at a first gain level, and said second receiver arrangement being activated and thereby receiving signals at a second gain level, said second gain level being equal or lower than said first gain level; and
    a baseband unit configured for:
    measuring baseband consumption at the base station at predetermined intervals, and
    in case the baseband consumption exceeds a predetermined deactivation threshold THDE deactivating the first receiver arrangement, thereby leaving only the second receiver arrangement active.

5. The system according to claim 4, wherein the baseband unit is additionally configured for, in case the baseband consumption goes below a predetermined activation threshold THAC, activating the first receiver arrangement, thereby receiving signals at an increased gain level in the base station.

6. The system according to claim 4, wherein the first receiver arrangement is a 2-way receiver arrangement and the second receiver arrangement is a 2-way receiver arrangement, such that the first and second receiver arrangement together form a 4-way receiver arrangement.

* * * * *